United States Patent
Hu et al.

(10) Patent No.: US 10,408,246 B2
(45) Date of Patent: Sep. 10, 2019

(54) RECEIVING DEVICE AND ELECTRONIC DEVICE WITH THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Lei Hu, Shenzhen (CN); Chia-Jui Hu, New Taipei (TW); Hao-Yuan Huang, New Taipei (TW); Yen-Yu Chen, New Taipei (TW); Chun-Kai Peng, New Taipei (TW); Jian-Guo Wu, Shenzhen (CN); Xin Yang, Shenzhen (CN)

(73) Assignees: Fu Tai Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/867,735

(22) Filed: Jan. 11, 2018

(65) Prior Publication Data

US 2019/0017526 A1 Jan. 17, 2019

(30) Foreign Application Priority Data

Jul. 14, 2017 (CN) .................... 2017 2 0861395 U

(51) Int. Cl.
*F16B 1/00* (2006.01)
*F16B 2/22* (2006.01)
*G06F 3/0354* (2013.01)

(52) U.S. Cl.
CPC ................. *F16B 2/22* (2013.01); *F16B 1/00* (2013.01); *G06F 3/03545* (2013.01); *F16B 2001/0035* (2013.01); *G06F 2200/1632* (2013.01)

(58) Field of Classification Search
CPC ...... F16B 2/22; F16B 1/00; F16B 2001/0035; G06F 3/03545
USPC ..... 248/229.2, 229.26, 230.7, 231.81, 316.7, 248/918, 912
See application file for complete search history.

(56) References Cited

U.S. PATENT DOCUMENTS

| | | | | |
|---|---|---|---|---|
| 2,009,991 A | * | 8/1935 | Anderson | D06F 55/00 24/336 |
| 2,567,554 A | * | 9/1951 | Davey | B43L 7/00 33/492 |
| 2,693,788 A | * | 11/1954 | Spatz | B43M 99/004 211/69.1 |
| 3,039,232 A | * | 6/1962 | Dunn | E04D 3/36 52/204.591 |
| 3,907,239 A | * | 9/1975 | Ehrlich | F16B 2/245 24/339 |
| 4,026,055 A | * | 5/1977 | Weast | F41G 11/003 42/124 |

(Continued)

*Primary Examiner* — Anita M King
(74) *Attorney, Agent, or Firm* — ScienBiziP, P.C.

(57) ABSTRACT

A receiving device for an electronic device, to hold a stylus, includes a top member, a bottom member, and a connection member. The bottom member faces the top member, the connection member is arranged between the top member and the bottom member. A clamping member and a receiving member are formed between the top member, the bottom member, and the connection member. The clamping member faces away from the receiving member, the clamping member is clamped onto an electronic device, the receiving member receives a stylus.

6 Claims, 3 Drawing Sheets

(56) References Cited

U.S. PATENT DOCUMENTS

| | | | | |
|---|---|---|---|---|
| 4,865,285 A * | 9/1989 | Gaggianese | ......... | B43M 99/004 |
| | | | | 211/69.1 |
| 5,137,243 A * | 8/1992 | Stevens | ................ | A47G 25/12 |
| | | | | 248/316.7 |
| 5,297,889 A * | 3/1994 | Crouse | .................... | E06C 1/16 |
| | | | | 182/127 |
| 5,743,414 A * | 4/1998 | Baudino | ............. | B43K 23/001 |
| | | | | 211/69.1 |
| 5,813,786 A * | 9/1998 | Fraenkel | ............. | B43K 23/001 |
| | | | | 24/10 R |
| 5,836,055 A * | 11/1998 | Cooper | ................ | A45D 40/00 |
| | | | | 24/339 |
| 7,444,792 B2 * | 11/2008 | Matson | .................. | E04D 12/00 |
| | | | | 24/336 |
| 9,268,379 B2 * | 2/2016 | Ashcraft | ................... | G06F 1/26 |
| 9,271,551 B2 * | 3/2016 | Ma | ........................ | A45B 25/02 |
| 9,327,544 B2 * | 5/2016 | Ceruzzi | ............... | B43K 23/001 |
| 9,778,700 B2 * | 10/2017 | Zaloom | ................ | G06F 1/1656 |
| 2009/0114144 A1 * | 5/2009 | Keefe | .................. | B42D 9/005 |
| | | | | 116/234 |
| 2011/0157100 A1 * | 6/2011 | Hsieh | ................ | G06F 3/03545 |
| | | | | 345/179 |
| 2012/0037771 A1 * | 2/2012 | Kitchen | ............... | G06F 1/1632 |
| | | | | 248/223.41 |
| 2015/0343831 A1 * | 12/2015 | Ceruzzi | ............... | B43K 23/001 |
| | | | | 24/304 |

* cited by examiner

RECEIVING DEVICE AND ELECTRONIC DEVICE WITH THE SAME

CROSS-REFERENCE TO RELATED APPLICATIONS

This application claims priority to Chinese Patent Application No. 201720861395.3 filed on Jul. 14, 2017, the contents of which are incorporated by reference herein.

FIELD

The subject matter herein generally relates to mechanical devices, and particularly to a receiving device and an electronic device with the same.

BACKGROUND

Smart electronic devices such as smart phones or personal computers can be configured with a stylus, which is used for performing touching operations on a touch panel. However, the stylus cannot usually be conveniently kept on the electronic device. Improvement in the art is preferred.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
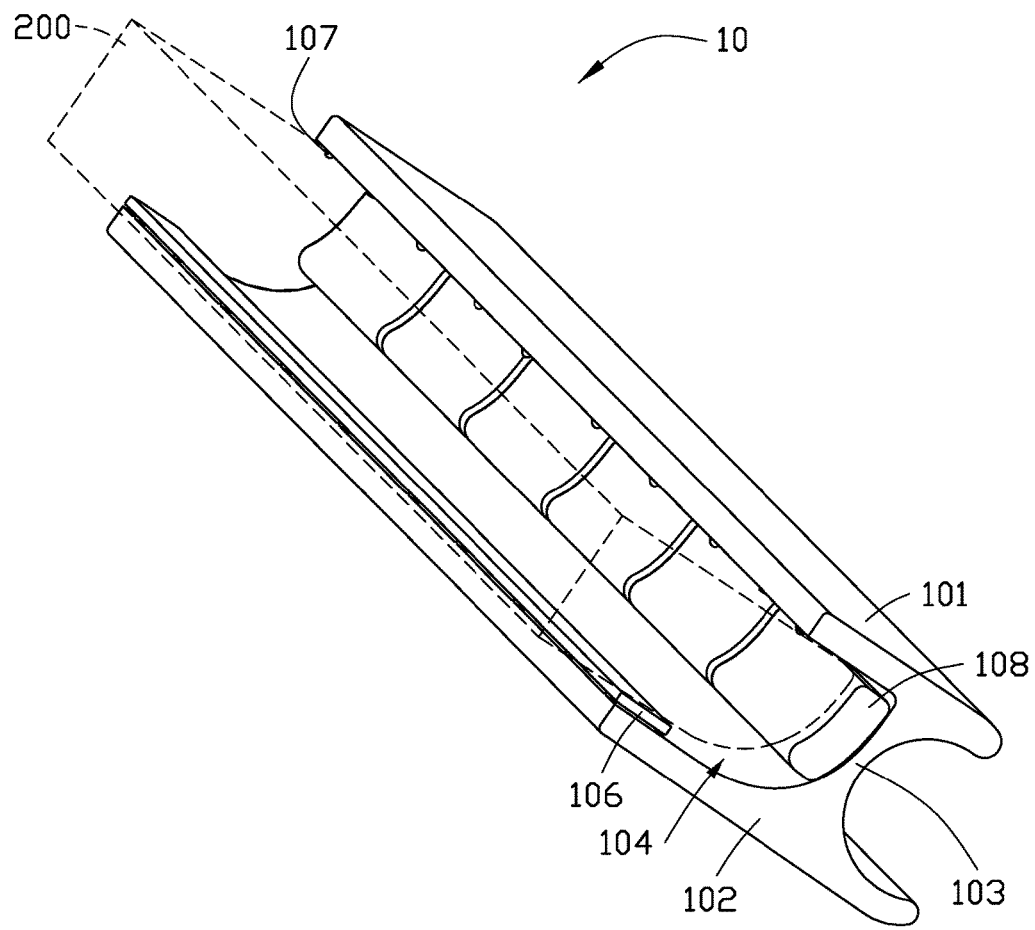
FIG. 1 is a schematic drawing illustrating an exemplary embodiment of a receiving device for an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one".

The term "comprising" means "including, but not necessarily limited to", it specifically indicates open-ended inclusion or membership in a so-described combination, group, series, and the like.

Figure 2:
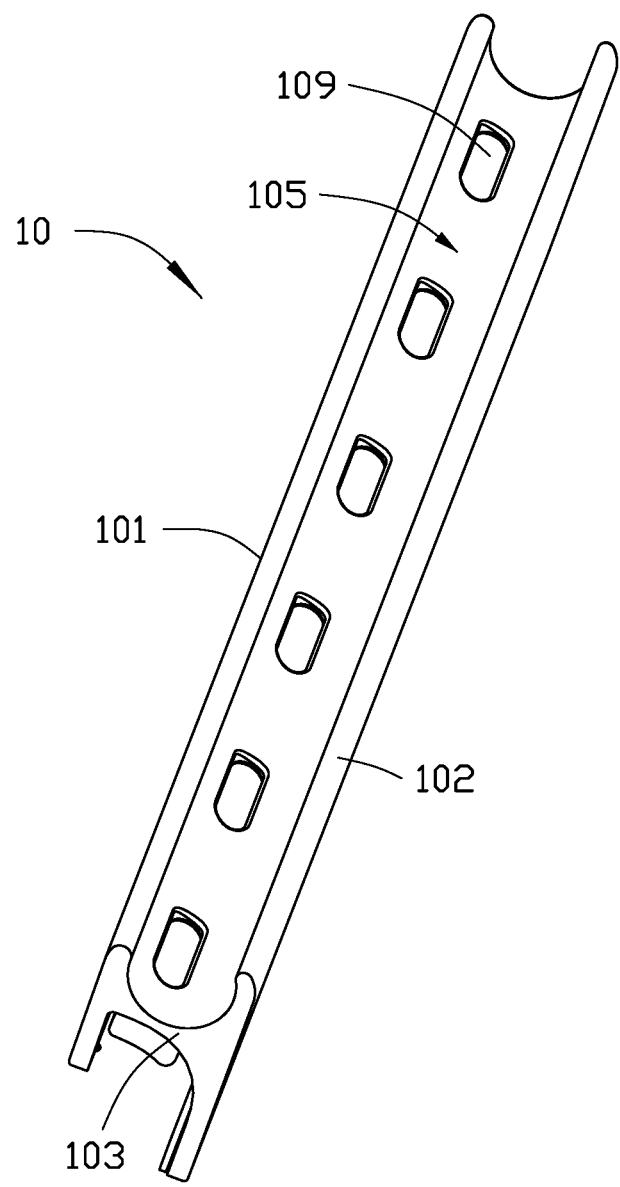
FIG. 2 is a schematic drawing of the receiving device in FIG. 1 from another angle.

FIGS. 1-2 illustrate an exemplary embodiment of a receiving device 10. In at least one exemplary embodiment, the receiving device 10 can be applied to an electronic device (not shown). The electronic device can be a smart phone or a tablet computer. The receiving device 10 can be movably arranged on the electronic device, and is used for receiving a stylus.

A cross section of the receiving device 10 is substantially a shape of a letter "H". The receiving device 10 includes a top member 101, a bottom member 102, and a connection member 103. The top member 101 faces the bottom member 102. The connection member 103 is arranged between the top member 101 and the bottom member 102, so as to connect the top member 101 to the bottom member 102, thus the receiving device 10 is formed as the H-shaped structure.

In at least one exemplary embodiment, the top member 101, the bottom member 102, and the connection member 103 are integrally formed through molding. A clamping member 104 and a receiving member 105 are formed between the top member 101, the bottom member 102, and the connection member 103.

Figure 3:
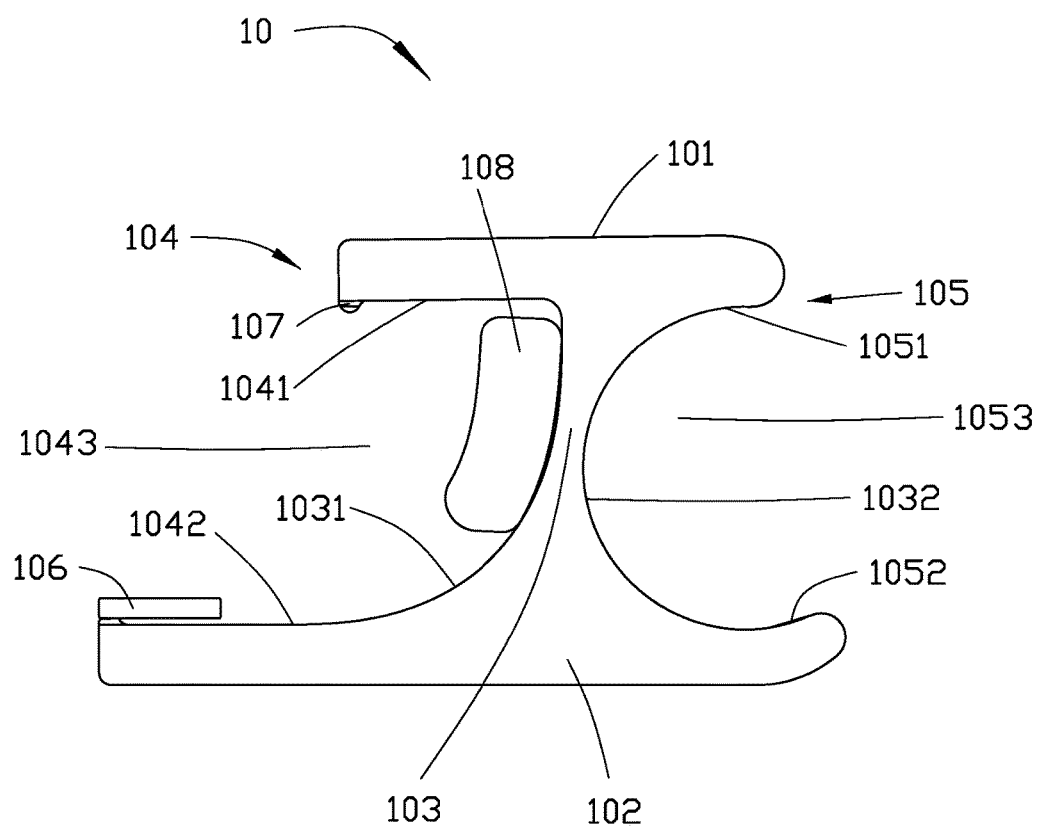
FIG. 3 is a front drawing of the receiving device in FIG. 1.

Referring to FIG. 3, the connection member 103 includes a first surface 1031 and a second surface 1032. The second surface 1032 faces away from the first surface 1031, the first surface 1031 and the second surface 1032 are both arc-shaped. The clamping member 104 is formed by the top member 101, the bottom member 102, and the first surface 1031 of the connection member 103. The receiving member 105 is formed by the top member 101, the bottom member 102, and the second surface 1032 of the connection member 103.

In at least one exemplary embodiment, the clamping member 104 faces away from the receiving member 105. A shape and a structure of the clamping member 104 match a shape and a structure of the electronic device, which is convenient for being clamped to the electronic device. A shape and a structure of the receiving member 105 match a shape and a structure of the stylus.

A cross section of the clamping member 104 is substantially shaped as a letter "J", the clamping member 104 includes a first clamping surface 1041, a second clamping surface 1042, and the first surface 1031. An inner surface of the top member 101 is divided into two portions by the connection member 103, the first clamping surface 1041 is one of the two portions. An inner surface of the bottom member 102 is also divided into two portions by the connection member 103, the second clamping surface 1042 is one of the two portions. The first clamping surface 1041 faces the second clamping surface 1042. The first surface 1031 connects the first clamping surface 1041 to the second clamping surface 1042 to form an opening 1043 on the clamping member 104. The opening 1043 is used to clamp onto the electronic device.

In at least one exemplary embodiment, the clamping member 104 is made from elastic material, such as plastic material, thus the clamping member 104 has good flexibility and can be clamped to electronic devices with different sizes.

In at least one exemplary embodiment, the first clamping surface 1041 and/or the second clamping surface 1042 each define a number of filling strips 106. The filling strips 106 are made from elastic material. The filling strips 106 are arranged on an edge of the first clamping surface 1041 and/or the second clamping surface 1042. The filling strips 106 can increase a clamping force of the clamping member 104, and prevent the electronic device from being easily detached from the clamping member 104.

In other exemplary embodiments, the first clamping surface 1041 and/or the second clamping surface 1042 each define a number of touch points 107. The touch point 107 is a bulging structure. The touch points 107 are arranged at intervals on an edge of the first clamping surface 1041 and/or the second clamping surface 1042. The touch points 107 can increase a clamping force of the clamping member 104, and also prevent the electronic device from being easily detached from the clamping member 104.

In other exemplary embodiments, the first clamping surface 1041 and/or the second clamping surface 1042 each define a number of touch points 107, a filling strip 106 is arranged on each touch point 107. The touch points 107 and filling strips 106 are arranged at intervals on an edge of the first clamping surface 1041 and/or the second clamping surface 1042. The touch points 107 and filling strips 106 can increase a clamping force of the clamping member 104, and also prevent the electronic device becoming detached from the clamping member 104.

A cross section of the receiving member 105 is C-shaped, the receiving member 105 includes a first limiting portion 1051, a second limiting portion 1052, and the second surface 1032. The first limiting portion 1051 is another one of the two portions of the inner surface of the top member 101. The second limiting portion 1052 is another one of the two portions of the inner surface of the bottom member 102. The first limiting portion 1051 faces the second limiting portion 1052. The second surface 1032 is connected to the first limiting portion 1051 and the second limiting portion 1052 to form an opening 1053 on the receiving member 105. The opening 1053 is used to clamp the stylus.

In at least one exemplary embodiment, the receiving member 105 is made from elastic material, such as plastic material, thus the receiving member 105 has good flexibility, which is convenient for receiving the stylus. In addition, the receiving member 105 receives the stylus by means of interference fit, a length of the receiving member 105 is greater than a length of the stylus.

In at least one exemplary embodiment, the receiving member 10 further includes at least one magnetic component 108. The magnetic component 108 is arranged on the first surface 1031 of the connection member 103. The magnetic component 108 is magnetically attached to the electronic device, thus the clamping member 104 can clamp onto the electronic device more steadily.

In at least one exemplary embodiment, the connection member 103 defines at least one through hole 109 as shown in FIG. 2, the through hole 109 passes through the first surface 1031 and the second surface 1032 of the connection member 103, thus the clamping member 104 and the receiving member 105 are connected with each other. A size of the through hole 109 matches with a size of the magnetic component 108. The magnetic component 108 passes through the through hole 109 and is exposed into the receiving member 105. Thus, the magnetic component 108 can further attract the stylus and the receiving member 105 can receive the stylus more steadily.

In at least one exemplary embodiment, the structure of receiving device 10 is simple, and the receiving device 10 can be clamped on the electronic device and receive the stylus at the same time. Thus, the receiving device 10 can be conveniently kept on the electronic device, and the stylus can be conveniently received in the receiving device 10 and be taken out of the receiving device 10 as necessary.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A receiving device comprising:
   a top member;
   a bottom member facing the top member; and
   a connection member arranged between the top member and the bottom member, and comprising a first surface and a second surface facing away from the first surface;
   wherein a clamping member and a receiving member are formed between the top member, the bottom member, and the connection member, the connection member defines at least one through hole, the through hole passes through the first surface and the second surface of the connection member such that the clamping member and the receiving member are connected to each other;
   wherein the clamping member comprises a first clamping surface, a second clamping surface, and the first surface, the first clamping surface faces the second clamping surface, the first surface is connected to the first clamping surface and the second clamping surface to form an opening; and
   wherein the clamping member faces away from the receiving member, the clamping member is configured to attach to an electronic device and the receiving member is configured to receive a stylus.

2. The receiving device according to claim 1, wherein the first clamping surface and the second clamping surface each defines a plurality of filling strips, the filling strips are arranged on an edge of the first clamping surface and the second clamping surface.

3. The receiving device according to claim 1, wherein the first clamping surface and the second clamping surface each defines a plurality of touch points, the touch points are arranged at intervals on an edge of the first clamping surface and the second clamping surface.

4. An electronic device comprising:
   a receiving device removably attached to the electronic device to receive a stylus, comprising,
   a top member;
   a bottom member facing to the top member; and
   a connection member arranged between the top member and the bottom member, and comprising a first surface and a second surface facing away from the first surface, wherein a clamping member and a receiving member are formed between the top member, the bottom member, and the connection member, the connection member defines at least one through hole, the through hole passes through the first surface and the second surface of the connection member such that the clamping member and the receiving member are connected to each other, the clamping member comprises a first clamping surface, a second clamping surface, and the first surface; wherein the first clamping surface faces the second clamping surface, the first surface is connected to the first clamping surface and the second clamping surface to form an opening, the clamping member faces away from the receiving member, the clamping member is configured to attach to an electronic device and the receiving member is configured to receive a stylus.

5. The electronic device according to claim 4, wherein the first clamping surface and the second clamping surface each defines a plurality of filling strips, the filling strips are arranged on an edge of the first clamping surface and the second clamping surface.

6. The electronic device according to claim 4, wherein the first clamping surface and the second clamping surface each defines a plurality of touch points, the touch points are arranged at intervals on an edge of the first clamping surface and the second clamping surface.

* * * * *

UNITED STATES PATENT AND TRADEMARK OFFICE
CERTIFICATE OF CORRECTION

PATENT NO. : 10,408,246 B2  
APPLICATION NO. : 15/867735  
DATED : September 10, 2019  
INVENTOR(S) : Lei Hu et al.

Page 1 of 1

It is certified that error appears in the above-identified patent and that said Letters Patent is hereby corrected as shown below:

On the Title Page

Please replace Item (73) regarding "Assignees" with the following:  
(73) Fu Tai Hua Industry (Shenzhen) Co., Ltd., Shenzhen (CN);  
      HON HAI PRECISION INDUSTRY CO., LTD., New Taipei (TW)

Signed and Sealed this  
Twenty-second Day of December, 2020

Andrei Iancu  
*Director of the United States Patent and Trademark Office*